(12) United States Patent
Ito

(10) Patent No.: US 8,786,762 B2
(45) Date of Patent: Jul. 22, 2014

(54) IMAGING DEVICE AND AUTOMATIC FOCUS ADJUSTMENT METHOD

(75) Inventor: Satoru Ito, Komae (JP)

(73) Assignee: Olympus Imaging Corp., Tokyo (JP)

( * ) Notice: Subject to any disclaimer, the term of this patent is extended or adjusted under 35 U.S.C. 154(b) by 738 days.

(21) Appl. No.: 13/032,972

(22) Filed: Feb. 23, 2011

(65) Prior Publication Data

US 2011/0205403 A1    Aug. 25, 2011

(30) Foreign Application Priority Data

Feb. 25, 2010    (JP) .................................. 2010-039586

(51) Int. Cl.
*H04N 5/232* (2006.01)

(52) U.S. Cl.
USPC ............................ 348/353; 348/345; 348/349

(58) Field of Classification Search
CPC ............................ H04N 5/23212; G02B 7/36
USPC .............. 348/345, 349, 353, 354; 396/89, 98, 396/102
See application file for complete search history.

(56) References Cited

U.S. PATENT DOCUMENTS

2008/0240700 A1 * 10/2008 Takagi ............................ 396/98
2009/0016709 A1 * 1/2009 Wen .............................. 348/349

FOREIGN PATENT DOCUMENTS

JP    2005-156597    6/2005
JP    2005-345877    12/2005

OTHER PUBLICATIONS

Office Action from corresponding Japanese Patent Application No. 2010-039586, mailed Jan. 6, 2014 (4 pgs.).

* cited by examiner

*Primary Examiner* — Nhan T Tran
(74) *Attorney, Agent, or Firm* — John C. Pokotylo; Straub & Pokotylo

(57) ABSTRACT

An imaging device of the present invention comprises an imaging section for forming a subject image using a photographing lens and generating image data, a contrast detection section for detecting contrast values corresponding to contrast of the subject image, for every position of the photographing lens, based on the image data, a subject brightness detection section for detecting brightness evaluation values corresponding to subject brightness of the subject image for every position of the photographing lens, based on the image data, a correction section for correcting the contrast values depending on a brightness evaluation value for a corresponding position of the photographing lens and calculating corrected contrast value, and a focus detection section for detecting a focus position of the photographing lens based on the corrected contrast values that have been corrected by the correction section.

10 Claims, 7 Drawing Sheets

(1) DIRECTION DETERMINATION
(2) PEAK DETECTION
(3) MOVE TO PEAK POSITION

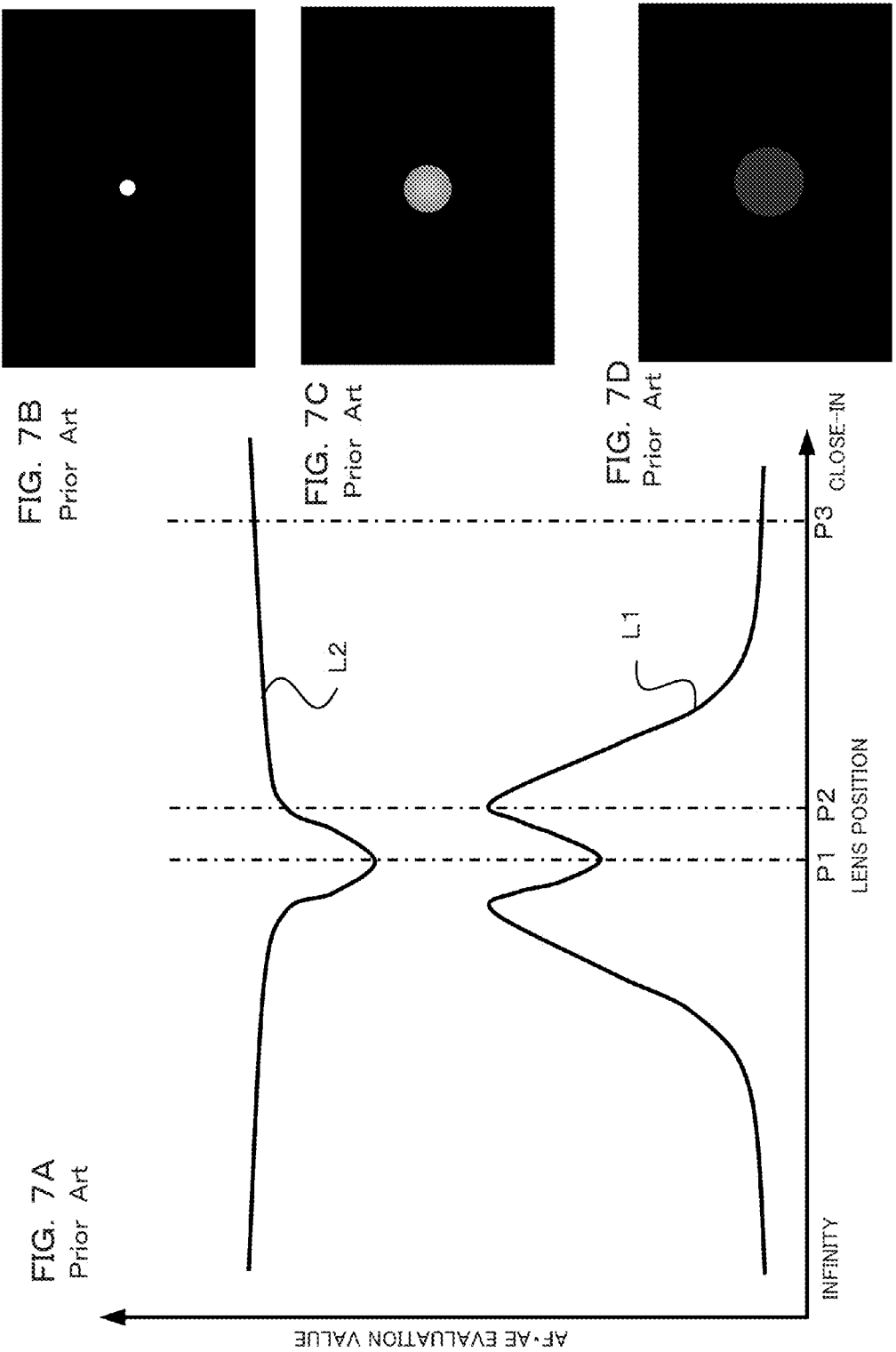

IMAGING DEVICE AND AUTOMATIC FOCUS ADJUSTMENT METHOD

Benefit is claimed, under 35 U.S.C. §119, to the filing date of prior Japanese Patent Application No. 2010-039586 filed on Feb. 25, 2010. This application is expressly incorporated herein by reference. The scope of the present invention is not limited to any requirements of the specific embodiments described in the application.

BACKGROUND OF THE INVENTION

1. Field of the Invention

The present invention relates to an imaging device and an automatic focus adjustment method, and in detailed relates to an imaging device and automatic focus adjustment method capable of accurate focus detection even for a subject such as a point light source when taking photographs at night.

2. Description of the Related Art

As a method for automatic focus detection for a photographing lens provided in an imaging device, a contrast AF method has conventionally been used. This contrast AF method is a method that calculates a contrast value for a subject image formed by the photographing lens, and controls position of the photographing lens so that this contrast value becomes a peak value.

The conventional contrast AF operation will be described using FIG. 6A and FIG. 6B. FIG. 6A shows variation in an AF evaluation value L1 and an AE evaluation value L2 with respect to lens position of the photographing lens. Here, the AF evaluation value L1 is an integrated value of contrast values, and the AE evaluation value is a value relating to subject brightness. If the photographing lens is moved between infinity and the close-up end, the AF evaluation value will become maximum at a focus position P1, as shown in FIG. 6A. With focus control using contrast AF therefore, the photographing lens is controlled so that the AF evaluation value becomes the peak value. Ordinarily, the AE evaluation value relating to subject brightness does not vary significantly, even if there is variation in the lens position of the photographing lens, In the flowchart shown in FIG. 6B, control using contrast AF first performs direction determination (S101). Here, a contrast value is obtained based on image data from an image sensor, and then a contrast value is obtained again with the photographing lens having been moved a specified amount in a predetermined direction, the size of these two contrast values is compared, and the direction in which the contrast value becomes larger is determined to be the movement direction of the photographing lens (refer to movement (1) in FIG. 6A).

Once directional determination has been carried out, peak value detection for the contrast value is carried out (S103). Here, contrast values are compared each time the photographing lens is moved, and it is determined whether a contrast value peak is passed through. Specifically, when a current contrast value has become smaller than the previous contrast value, a peak of the contrast value has been passed through, and so a peak position at this time is detected using an interpolation technique or the like (refer to movement (2) in FIG. 6A).

If a peak position is detected, the lens is moved to this detected peak position (S105). Here, the photographing lens is returned to the peak position that was calculated using an interpolation technique or the like in step S103. As a result, it is possible to bring the photographing lens to a focus position (refer to movement (3) in FIG. 6A).

In this manner, it is possible to drive the photographing lens to a focus point using contrast AF. However, if focus detection is carried out using this conventional contrast AF, there is a possibility of focusing on a false focus point in a case where the subject is a point light source. False focus for the case of a point light source will be described using FIG. 7A to FIG. 7D.

In the case of forming an image of a point light source subject using a photographing lens, at a focus position P1, as shown in FIG. 7B, the point light source is at its smallest, and the AF evaluation value L1 is also at a minimum at this time. If the photographing lens is driven from the focus position P1, the image formed by the photographing lens gradually becomes blurred and larger, and the AF evaluation value L1 also becomes larger. At a maximum position P2, the image becomes as shown in FIG. 7C, and the AF evaluation value is at a maximum value. If the lens is moved further from this maximum position P2, then the image formed by the photographing lens is blurred more and more on the slope part of the AF evaluation value L1 curve (in the vicinity of position P3), and the AF evaluation value becomes a small value.

In the case of this type of point light source, there is a possibility of the maximum position P2 where there is a peak of the AF evaluation value being determined as the focus position of the photographing lens. Therefore, in order to solve this disadvantage, the following solutions have been proposed in Japanese patent laid-open No. 2005-345877 (laid-open Dec. 15, 2005).

(1) Depending on subject brightness (=Bv) at the time of AF, a focus position is selected from either a minimum position of AE evaluation value or maximum position of AF evaluation value.

(2) Distance between the minimum position of AE evaluation value and the maximum position of AF evaluation value is calculated, and either the maximum or minimum is selected as the focus position depending on this distance.

With the above described solution (1), for a point light source, since the AE evaluation value becomes a minimum value at focus position P1, whether or not it is a night scene etc. in which point light sources appear is determined using subject brightness (=Bv), and in the case where subject brightness is low the minimum position of the AE evaluation value is made the focus point. Also, with the above described solution (2), in the case of a point light source the distance between the focus position P1 and the maximum position P2 is within a specified distance range, and depending on the distance either a minimum or maximum is made the focus position.

SUMMARY OF THE INVENTION

The present invention has as its object to provide an imaging device and automatic focus adjustment method capable of high-speed and reducing false focus for both a low brightness subject and a point light source subject.

An imaging device of the present invention comprises, an imaging section for forming a subject image using a photographing lens and generating image data, a contrast detection section for detecting contrast values corresponding to contrast of the subject image, for every position of the photographing lens, based on the image data, a subject brightness detection section for detecting brightness evaluation values corresponding to subject brightness of the subject image for every position of the photographing lens, based on the image data, a correction section for correcting the contrast values depending on a brightness evaluation value for a corresponding position of the photographing lens and calculating corrected contrast value, and a focus detection section for detecting a focus position of the photographing lens based on the corrected contrast values that have been corrected by the correction section.

Also, an automatic focus adjustment method of the present invention comprises, forming an image using a lens to generate image data, detecting contrast values corresponding to contrast of the image, for every position of the lens, based on the image data, detecting brightness evaluation values corresponding to brightness of the image for every position of the lens, based on the image data, correcting the contrast values depending on a brightness evaluation value for a corresponding position of the lens and calculating corrected contrast values, and detecting a focus position of the lens based on the corrected contrast values.

BRIEF DESCRIPTION OF THE DRAWINGS

FIG. 7A to FIG. 7D are drawings for describing a conventional contrast AF operation, with FIG. 7A showing a contrast curve in the case of a point light source, and FIG. 7B to FIG. 7D showing images of a point light source depending on position of the photographing lens.

DETAILED DESCRIPTION OF THE PREFERRED EMBODIMENTS

Figure 1:
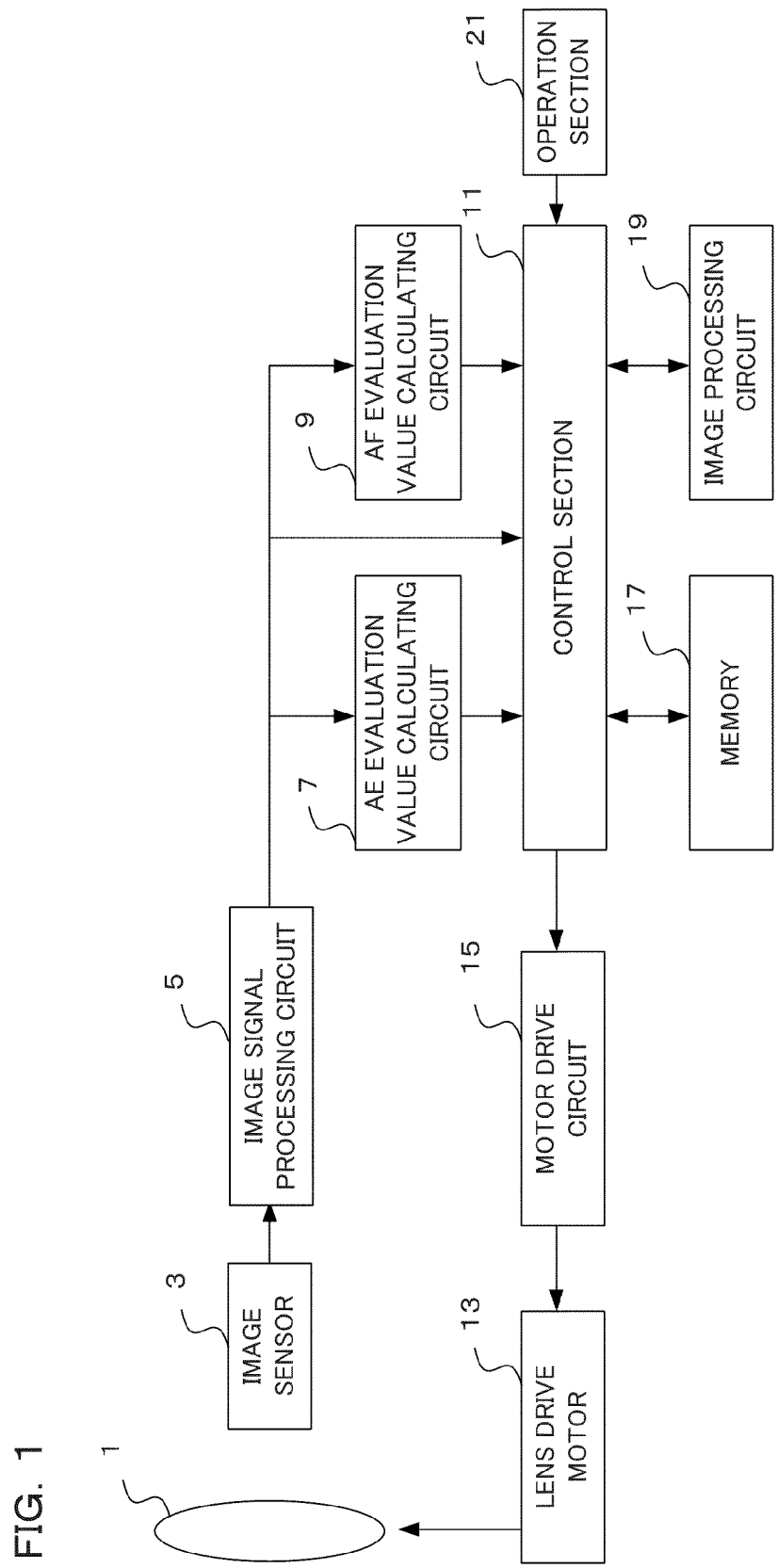
FIG. 1 is a block diagram mainly showing the electrical structure of a camera of one embodiment of the present invention.

Preferred embodiments using a camera to which the present invention has been applied will be described in the following. A camera of the one embodiment of the present invention is a digital camera, and to describe it briefly has an image sensor 3, with a subject image being converted to image data by this image sensor 3, and the subject image then being subjected to live view display on a display section (not shown) based on this converted image data. A photographer determines composition and photo opportunity by looking at the live view display at the time of shooting. If a release button in an imaging section 21 is pressed down halfway, automatic focus adjustment of a photographing lens 1 is carried out using contrast AF, and if the release button is then pressed down fully a picture is taken. Image data acquired at the time of shooting is subjected to image processing by an image processing circuit 19, and the image data that has been subjected to image processing is stored in a memory 17.

FIG. 1 is a block diagram mainly showing the electrical structure of the camera of this embodiment. The image sensor 3 is arranged on the optical axis of the photographing lens of this camera. Output of the image sensor 3 is connected to an image signal processing circuit 5, and output of the image signal processing circuit 5 is connected to an AE (automatic exposure) evaluation value calculating circuit 7, and AF (auto focus) evaluation value calculating circuit 9, and a control section 11. The control section 11 is connected to a motor drive circuit 15, the memory 17, the image processing circuit 19 and an operation section 21. A lens drive motor 13 is connected to the motor drive circuit 15, and the lens drive motor 13 varies the position of the photographing lens 1.

The photographing lens 1 is an optical system for concentrating subject light flux onto the image sensor 3, to form a subject image. This photographing lens 1 is moved in an optical axis direction using the lens drive motor 13, by the motor drive circuit 15 that operates in response to instructions from the control section 11, to change the focused state.

The image sensor 3 having a function as an imaging section comprises Bayer array color filters arranged on a front surface, and photoelectric conversion elements such as photodiodes arranged in correspondence with the color filters. Each pixel is made up of each color filter and its corresponding photoelectric conversion element, and an imaging region is made up of a pixel group. The image sensor 3 is a CCD (Charge Coupled Device) image sensor or a CMOS (Complementary Metal Oxide Silicon) image sensor or the like, and receives light that has been focused by the photographing lens 1 at each pixel and converts to photoelectric current, with this photoelectric current being stored in a capacitor (floating diffusion), and output to the image signal processing circuit 5 as analog voltage signals (image signals).

The image signal processing circuit 5 amplifies image signals output from the image sensor 3 and performs image processing such as analog to digital (AD) conversion. The AE evaluation value calculation circuit 7 that is connected to this image signal processing circuit 5 functions as a subject brightness detection section, and calculates an AE evaluation value (brightness evaluation value) based on image data output from the image signal processing circuit 5. This AE evaluation value is an integrated value or average value or the like based on image data of substantially the same region as a detection region for focus detection using contrast AF.

The AF evaluation value calculation circuit 9 functions as a contrast detection section, being input with image data of a predetermined detection region for focus detection, and calculates a value corresponding to contrast of the image for that region. At the time of contrast calculation, since it is preferable to extract a high frequency component of the image data, calculation is performed using a digital high pass filter. As well as the AE evaluation value calculation circuit 7 and the AF evaluation value calculation circuit 9 being implemented as the hardware circuits shown in this embodiment, the same functions can also be executed by the control section 11 using software.

The control section 11 is comprised of an ASIC (Application Specific Integrated Circuit) including a CPU (Central Processing Unit), and performs overall control of various sequences of the camera in accordance with programs stored in a non-volatile memory section. Also, the control section 11 is input with information from the AE evaluation value calculation circuit 7 and the AF evaluation value calculation circuit 9 etc., and carries out focus control of the photographing lens 1 by controlling the motor drive circuit 15 and the lens drive motor 13. At this time, the control section 11 functions as a correction section for calculating corrected contrast values that are AF evaluation values corrected using the AE evaluation value, and as a focus detection section for detecting a focus position of the photographing lens 1 based on the corrected contrast values. Also, the control section 11 calculates exposure control values (shutter speed and aperture etc.) to achieve optimum exposure based on subject brightness that has been calculated based on image data and set ISO speed etc., and performs exposure control based on these calculated exposure control values.

The operation section 21 that is connected to the control section 11 has operation members such as a power supply button, release button and various input keys. If a user operates any of the operations members of the operation section 21, the control section 11 executes various sequences according to the user operation. A release button inside the operation section 21 has a two-stage switch with a first release switch and a second release switch. If the release button is pressed down halfway, the first release switch is turned on, and if the release button is pressed down further from the halfway point to a fully pressed state the second release switch is turned on. If the first release switch is turned on, the control section 11 executes shooting preparation sequences such as AE processing and AF processing. If the second release switch is turned on, the control section 11 executes a shooting sequence and takes a picture.

The image processing circuit 19 that is connected to the control section 11 carries out image processing such as white balance correction, demosaicing processing and color conversion processing on image data output by the image signal processing circuit 5. The image processing circuit 19 also carries out face detection as to whether or not there is a portion having a person's face within the screen, based on the image data. The image processing section 19 also carries out image compression at the time of storage in the memory 17, and expansion of compressed image data that has been read out from the memory 17.

The memory 17 connected to the control section 11 is, for example, a storage medium that is inserted into and taken out of the camera body, and stores image data that has been compressed in the image processing section 19, and its associated data. A storage medium for storing image data etc. is not limited to one that is inserted into or removed from the camera body, and can be a storage medium such as a hard disk built in to the camera body.

Figure 4A:
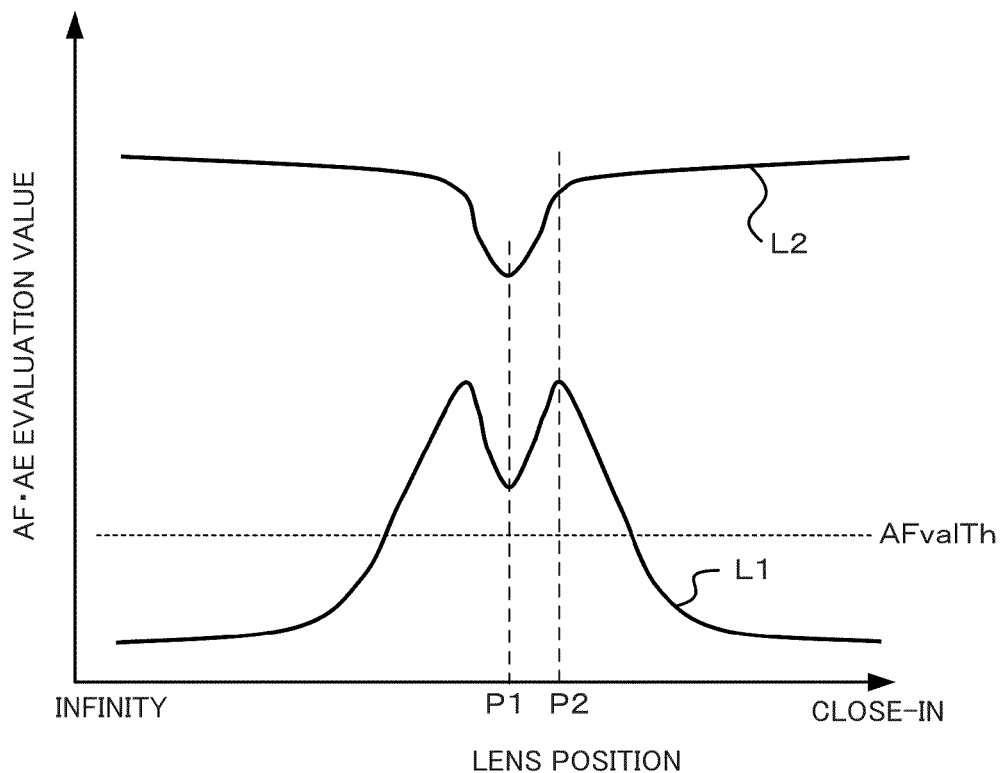
FIG. 4A and FIG. 4B are contrast curves for the camera of the one embodiment of the present invention for the case of a point light source, with FIG. 4A showing contrast curves for a case where there is no correction of AF evaluation values, and FIG. 4B showing contrast curves for a case where there is correction of AF evaluation values.

Next operation of this embodiment will be described, but first automatic focus control using contrast AF for this embodiment will be described using FIG. 4A and FIG. 4B. FIG. 4A shows contrast curves in the case of a subject that is a point light source, similarly to FIG. 7A described previously. An AF evaluation value L1 traces a curve before carrying out correction processing of this embodiment, and at a true focus position P1 the AF evaluation value L1 becomes a minimum value, while at a maximum position P2 the AF evaluation value L1 becomes a maximum value.

Figure 4B:
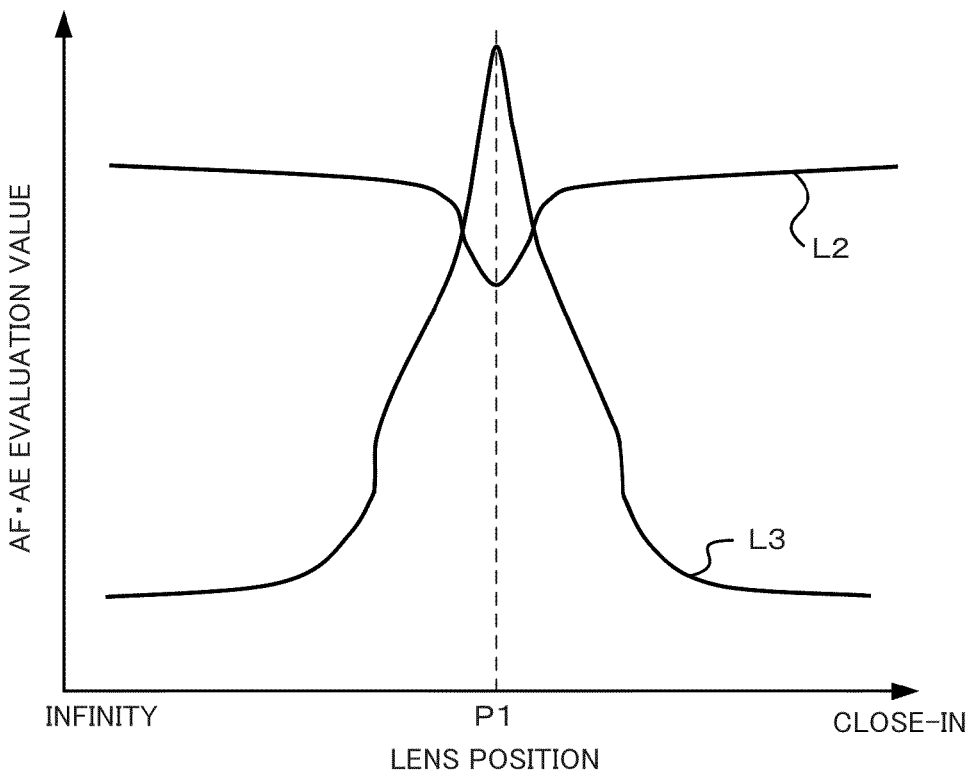

In this embodiment by correcting the AF evaluation value L1 using the AE evaluation value L2, an AF value L3 that has been subjected to correction is calculated, as shown in FIG. 4B. This AF evaluation value L3 has a peak value at the true focus position P1. Therefore, focus drive for the photographing lens 1 is carried out so that the AF evaluation value L3 becomes the peak value.

Figure 2:
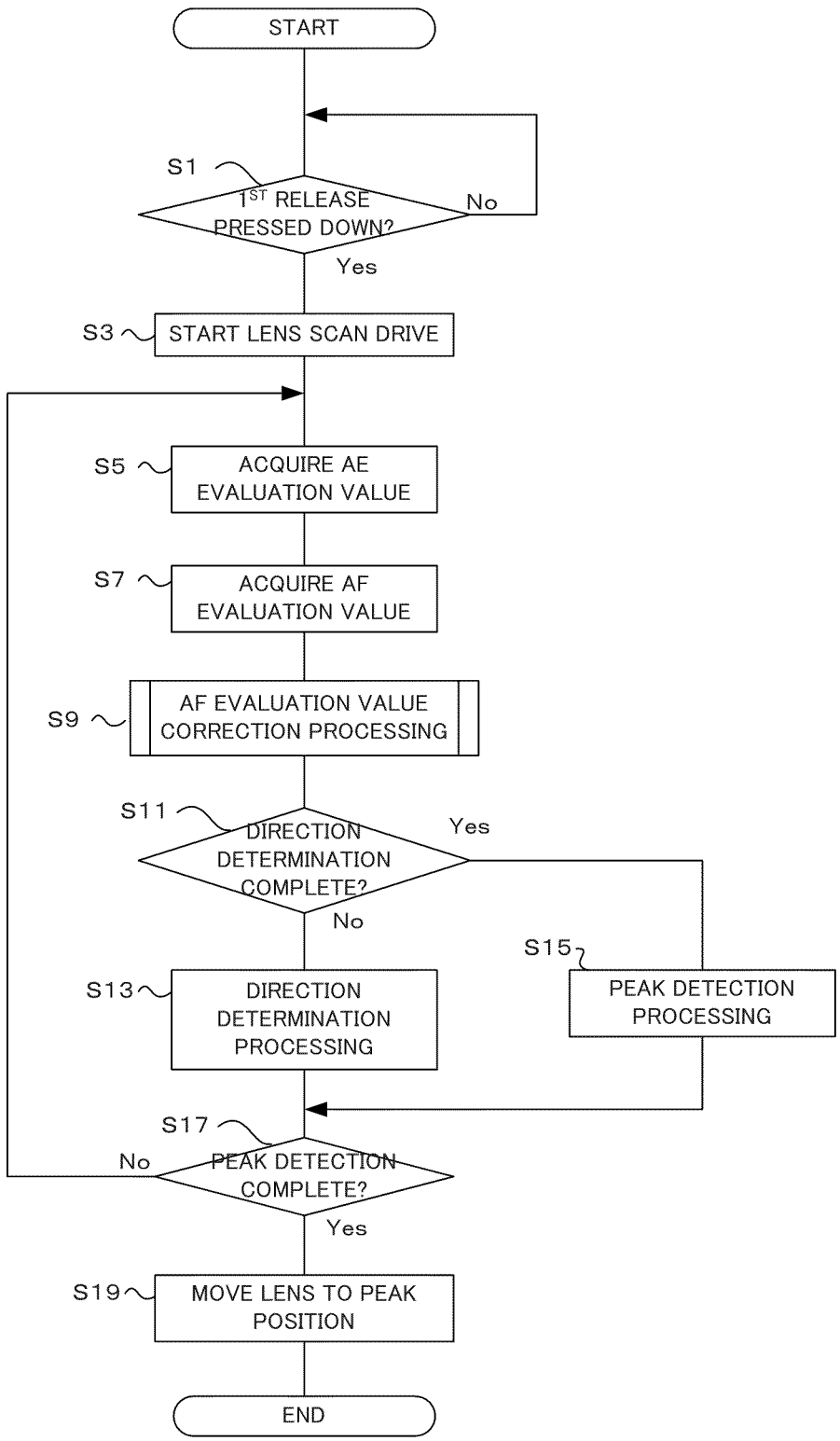
FIG. 2 is a flowchart showing operation of the camera of the one embodiment of the invention.

Next, operation of this embodiment will be described using the flowcharts shown in FIG. 2 and FIG. 3. The flowchart shown in FIG. 2 shows an auto focus adjustment operation using contrast AF carried out when a release button is pressed down half way taken from within processing flow for camera control. Operations other than the auto focus adjustment are normal camera control, and so they are omitted from the processing flow shown in FIG. 2. These flowcharts are executed by the control section 11 in accordance with programs stored in the non-volatile memory.

In the processing flow for camera control, it is first determined whether or not a first release has been pressed down (S1). If the first release button has been pressed down, the 1st release switch will be on, and so in this step determination is carried out based on the on/off state of the 1st release switch. If the result of this determination is that the 1st release has not been pressed down, a standby state is entered until the 1st release is pressed down.

If the result of determination in step S1 is that there the 1st release has been pressed down, lens scan drive is started next (S3). Here, the control section 11 instructs the motor drive circuit 15 to drive the lens drive motor 13 in a specified direction (toward the close-up end or infinity end).

Once lens scan drive is started, an AE evaluation value is next acquired (S5). Here, the AE evaluation value calculation circuit 7 calculates an AE evaluation value using image data based on image signals output from the image sensor 3. Acquisition of an AF evaluation value is then carried out (S7). Here the AF evaluation value calculation circuit 9 calculates an AF evaluation value using image data. The AE evaluation value and AF evaluation value are calculated using image data acquired with the photographing lens 1 in the same position.

Once AE evaluation value and AF evaluation value have been acquired, AF evaluation value correction processing is next carried out using these evaluation values (S9). Here a corrected AF evaluation value as was described using FIG. 4B is calculated, using the AE evaluation value. Specifically, at the true focus position P1, correction processing is carried out for the AF evaluation value so as to give a maximum value, not a minimum value. Detailed processing of this AF evaluation value correction processing will be described later using the flowchart shown in FIG. 3.

Once AF evaluation value correction processing has been carried out, it is next determined whether or not directional determination has been completed (S11). Here determination of the drive direction of the photographing lens 1 is carried out. As was described previously, the photographing lens 1 is driven in a direction that gives a large contrast value (AF evaluation value) with contrast AF, in this step it is determined whether or not determination of whether the drive direction to give a large AF evaluation value is towards the close-up end or the infinity end has been completed.

If the result of determination in step S11 is that direction determination has not been completed, direction determination processing is carried out (S13). Here, when the photographing lens 1 is moved in a specified direction the current and previous corrected AF evaluation values are compared, and if the corrected AF evaluation value has become larger that direction is determined to be the drive direction. On the other hand, if the corrected AF evaluation value becomes smaller the photographing lens 1 is driven in the reverse direction to the previous time and drive direction is determined depending on whether or not the corrected AF evaluation value becomes larger.

If the result of determination in step S11 is that direction determination has been completed, peak detection processing is carried out (S15). Here, a peak of the corrected AF evaluation value obtained in step S9 is detected while moving the photographing lens 1 in the movement direction of the photographing lens 1 that was determined in step S13. A peak can be located by detecting the corrected AF evaluation value changing from increasing to decreasing.

Once the direction determination processing of step S13 or the peak detection processing of step S15 have been carried out, it is next detected whether or not peak detection has been completed (S17). Here, this is determined based on a result of whether a peak of the corrected AF evaluation value has been detected by the peak detection processing of step S15.

If the result of determination in step S17 is that a peak has not been detected, processing returns to step S5, and the photographing lens 1 is driven and this loop repeated until a peak has been detected using the corrected AF evaluation value. On the other hand, if the result of determination in step S17 is that a peak has been detected, the lens is next driven to the peak position (S19). Here, the peak position is obtained by an interpolating method or the like based on position of the photographing lens 1 before the corrected AF evaluation value passes a peak, and the position of the photographing lens 1 when the peak has been passed, and the photographing lens 1 is driven to that position. Once the photographing lens 1 has been moved to the focus position, this processing flow is terminated.

Next, processing flow for the AF evaluation value correction processing of step S9 will be described using the flowchart shown in FIG. 3. If the processing flow for AF evaluation value correction is entered, it is first determined whether or not a measured Bv is larger than a reference Bv (S31). If a subject that is a point light source exists when the surrounding area is dark, such as in a night scene, since there is a possibility of the photographing lens 1 being driven to a false focus position, as described previously, in this step it is determined whether or not the surrounding area is brighter than a predetermined brightness.

In making the determination in step S31, an AE evaluation value output from the AE evaluation value calculation circuit 7 can be used for the measured Bv, but in this embodiment determination is made using a subject brightness value (=Bv) used for exposure control, in order to be able to carry out determination from brightness of the entire screen. This subject brightness for exposure control is calculated using image data output from the image signal processing circuit 5. The reference Bv can also be appropriately set depending on a brightness of the surroundings to the extent that false focus would arise for a subject of a point light source.

If the result of determination in step S31 is that the measured Bv is not larger than the reference Bv, that is, it is darker than a predetermined reference Bv, it is next determined whether or not a face has been detected (S33). If a person's face is contained within the subject, then since a face is generally taken to be a main subject, determination here is carried out based on whether or not there has been a face detected by the image processing circuit 19. Since it is preferable that there is no point light source contained within the subject, or as long as another subject that has priority is identified even if a point light source is contained, this determination is not limited to a face and can also be determination including a subject other than a face.

If the result of determination in step S33 is that a face has not been detected, it is next determined whether or not a set ISO is higher than a reference ISO (S35). Here, ISO represents the sensitivity of the image sensor, with a larger number indicating higher sensitivity. If ISO sensitivity is high, the level of the AF evaluation value becomes high. Correction processing of the AF evaluation values is therefore changed in steps S35 to S39 according to the set ISO sensitivity. In this step, determination is carried out by comparing ISO sensitivity set manually by the photographer, or ISO sensitivity automatically set according to subject brightness, with a predetermined reference ISO sensitivity.

If the result of determination in step S35 is that the set ISO is higher than reference ISO, reference Th1 is set as an AF evaluation value threshold level AFvalTh (S37). On the other hand, if the result of determination is that the set ISO is lower than the reference ISO, reference Th2 is set as the AF evaluation value threshold level AFvalTh (S39). Here, the AF evaluation value threshold level AFvalTh that has been set is used when carrying out the determination in subsequent step S41.

If the AF evaluation value threshold level AFvalTh is set in step S37 or S39, it is next determined whether or not an AF evaluation value before correction AFvalOrg is larger than the AF evaluation value threshold level AFvalTh (S41). Here, the AF evaluation value before correction AFvalOrg is a value output from the AF evaluation value calculation circuit 9, and is an AF evaluation value before correction.

If the result of determination in step S41 is that the AF evaluation value before correction AFvalOrg is larger than the AF evaluation value threshold level AFvalTh, an enhancement coefficient 1 is set as n (S43). Here, n is a strength coefficient when carrying out AF evaluation value correction. On the other hand, if the result of determination is that the AF evaluation value before correction AFvalOrg is smaller than the AF evaluation value threshold level AFvalTh, an enhancement coefficient 2 is set as the strength coefficient n (S45). These coefficients have the relationship enhancement coefficient 1>enhancement coefficient 2.

Also, if the result of determination in step S31 was that measured Bv is larger than reference Bv, or if the result of determination in step S33 was that a face was detected, 1 is set for the strength coefficient n (S47). This strength coefficient is an exponential function of equation (1) in step S49 which will be described later, and if n=1 it becomes proportional to the AF evaluation value. By setting n=1 to make a correction coefficient correspond to the AF evaluation value, it is possible to eliminate the effects of variation in brightness when calculating AF evaluation values after correction. Since there are occasions when it is determined that there it is not a point light source subject, by setting n=0 the correction coefficient is made 1, and AF evaluation values after correction can be made the same values as AF evaluation values before correction.

If the strength coefficient is set in step S43 to S47, AF evaluation values after correction are obtained from the following equation (1) (S49).

$$AFval=(AEvalStd/AEval)^{n}*AFvalOrg \qquad (1)$$

Here, AEvalStd is a reference AE evaluation value, and is set in advance to a value that is larger than a range of values can be taken by AE evaluation values AEval. Also, the AE evaluation value AEval is an AE evaluation value calculated by the AE evaluation value calculation circuit 7. As described previously, this AE evaluation value is a value corresponding to subject brightness that has been calculated based on image data of substantially the same region as a detection region for focus detection using contrast AF. Also, AFvalOrg is an AF evaluation value before correction, as described previously in step S41. "*" represents multiplication. Once a corrected AF evaluation value AFval has been calculated using this equation (1), the original processing flow is returned to.

In equation (1) described above AF evaluation value after correction AFval is calculated, and (AEvalStd/AEval) within equation 1, namely reference AE evaluation value/AE evaluation value, is multiplied by a value corresponding to a reduction in AE evaluation value (note that reference AE evaluation value>AE evaluation value). Specifically, as shown in FIG. 4A, AE evaluation value L2 is a minimum value at focus position P1, and so a value that is reference AE evaluation value, being a fixed value, divided by AE evaluation value L2 (namely AEvalStd/AEval) becomes maximum at the minimum value of AE evaluation value L2 (=minimum value of AF evaluation value L1). Accordingly, by multiplying the reference AE evaluation value/AE evaluation value (=AEvalStd/AEval) in equation (1) by AF evaluation value before correction, it is possible to correct the contrast curve that has the shape of a letter M shown in FIG. 4B to a peak shape.

Also, in order to carry out accurate correction a larger correction effect is obtained for lowered brightness by raising reference AE evaluation value/AE evaluation value. However, this raised correction is sensitive to brightness change, and so if collective correction is applied without consideration of the size of AF evaluation value before correction the slope of the contrast curve where change in AF evaluation value is inherently small will become rough. This situation will be described using FIG. 5A to FIG. 5C.

Figure 5A:
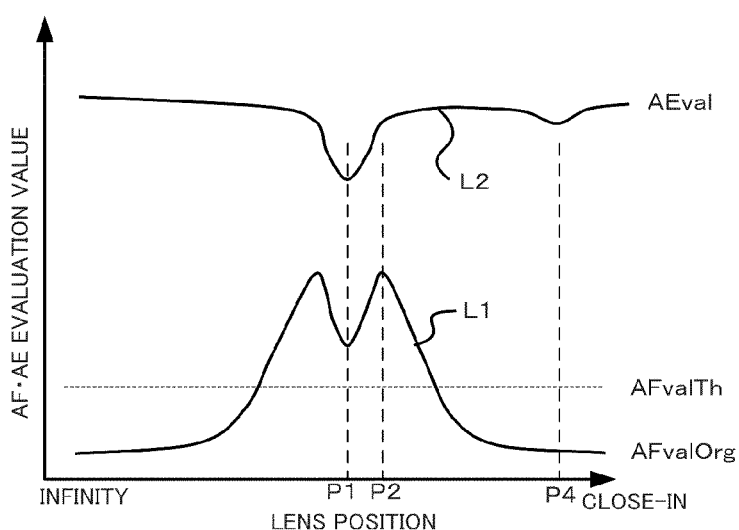
FIG. 5A to FIG. 5B are drawings describing false focus prevention at the time of low contrast, in the camera of the one embodiment of the present invention, with FIG. 5A showing contrast curves before AF evaluation value correction, FIG. 5B showing contrast curves after AF evaluation value correction, and FIG. 5C showing contrast curves after AF evaluation value correction and where false focus has also been corrected for the slope of the curve.
Figure 5B:
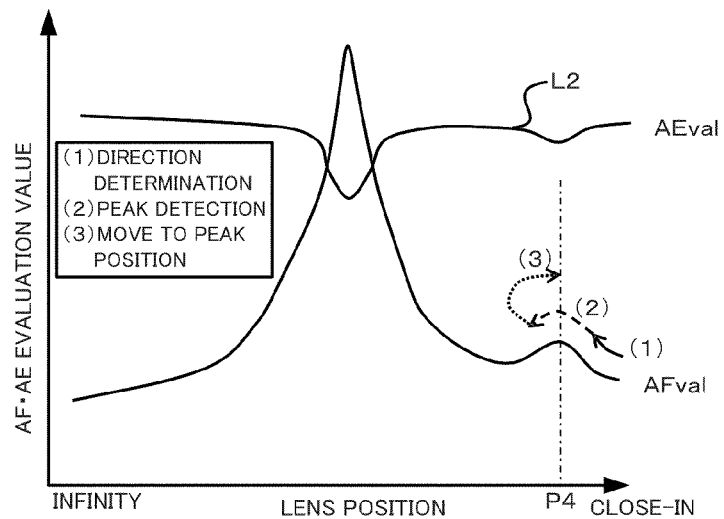

FIG. 5A shows AF evaluation value before correction AFvalOrg (L1), and has variation due to noise in AE evaluation value AEVal (L2) at position P4. If collective correction is carried out for this type of AF evaluation value before correction L1 without considering the size, in other words, if the value for the exponential function n is set across the board in equation (1) without considering the AF evaluation value before correction, then a maximum value will appear at position P4, as shown in FIG. 5B. If such a maximum appears in the AF evaluation value, then with contrast AF position P4 will be erroneously determined to be a focus position, giving a false focus.

Figure 5C:
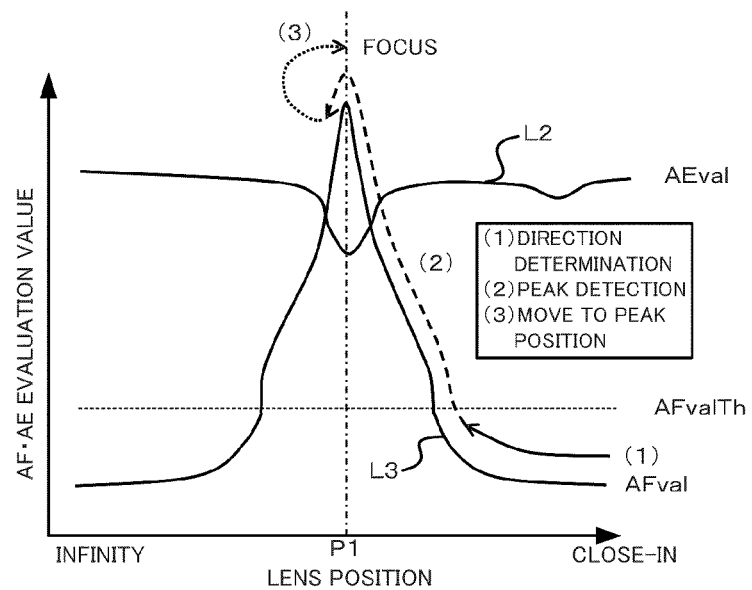
Figure 6A:
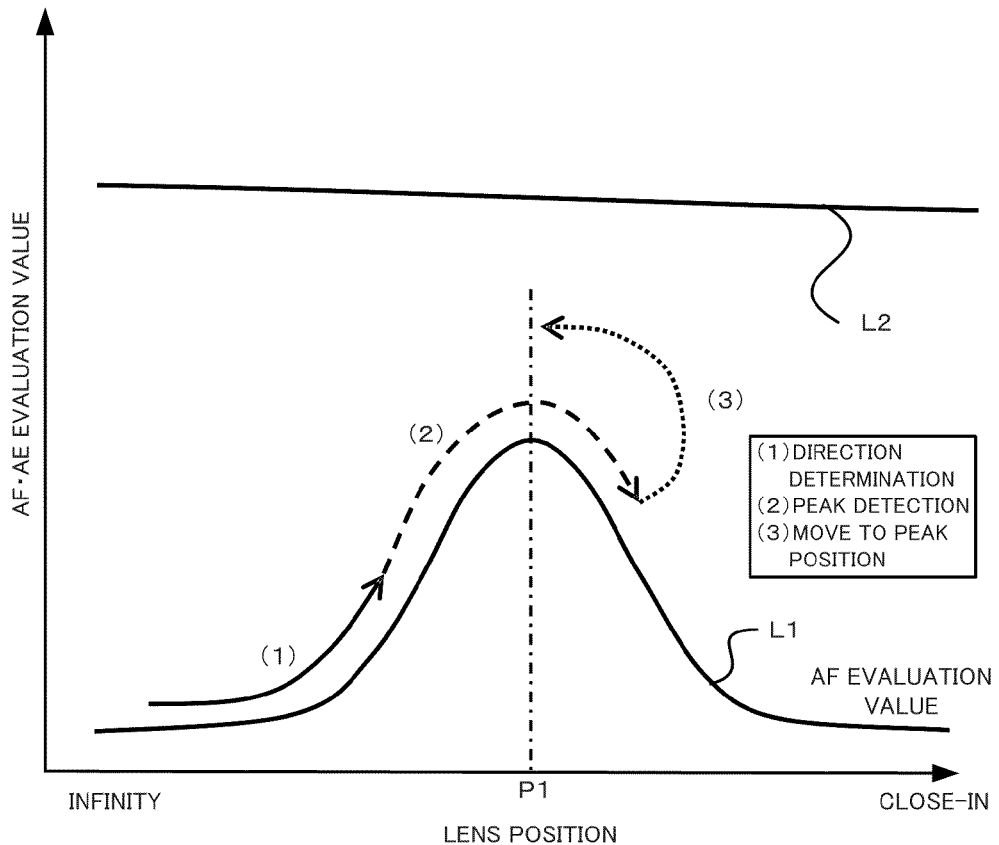
FIG. 6A and FIG. 6B are drawings for describing a conventional contrast AF operation, with FIG. 6A showing a contrast curve and FIG. 6B being a flowchart showing the contrast AF operation.
Figure 6B:
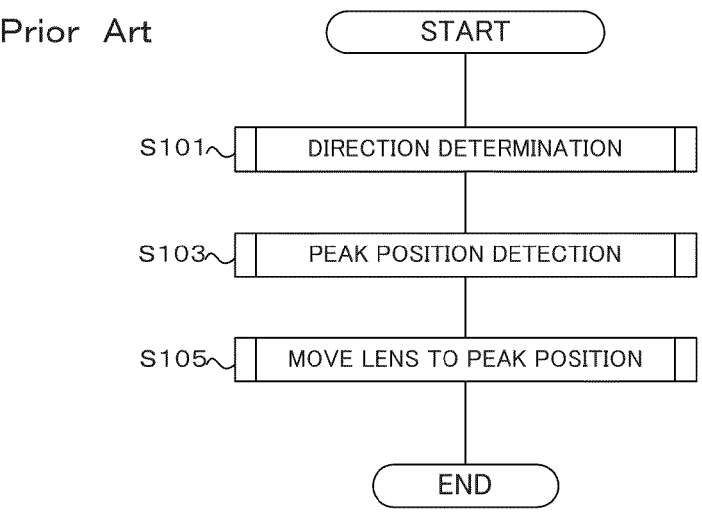

Therefore, in this embodiment, the value of the exponential function n is changed in accordance with whether or not the AF evaluation before correction AFvalOrg is larger than AF value evaluation threshold level AFvalTh in step S41 (refer to FIG. 5A and FIG. 5C). Specifically, if the AF evaluation value is larger than the AF evaluation value threshold level, the exponential function n becomes enhancement coefficient 1 and AF evaluation value is corrected with a large correction coefficient. On the other hand, if the AF evaluation value is smaller than the AF evaluation value threshold level, the exponential function n becomes enhancement coefficient 2 and AF evaluation value is corrected with a small correction coefficient. As a result of this correction, as shown in FIG. 5C, the AF evaluation value after correction L3 has a pointed shape at focus position P1, and the peak shape close to position P4 no longer exists.

As has been described above, in this embodiment, by correcting a contrast value (AFvalOrg) calculated by a contrast detection section (AF evaluation value calculation circuit 9) in accordance with a brightness evaluation value (AE evaluation value AEval) for a corresponding position of the photographing lens 1, a corrected contrast value (AFval) is calculated and a focus position of the photographing lens 1 is detected based on this corrected contrast value. It therefore becomes possible to increase speed and reduce false focus for both a low brightness subject and a point light source subject. Specifically, even if a contrast curve has an M shape, such as that shown in FIG. 4A, by carrying out correction a contrast curve having a peak shape as shown in FIG. 4B results, and so it is possible to reduce false focus. In the focus detection unit disclosed in Japanese patent laid-open No. 2005-345877, if both a maximum position and a minimum position are not detected, it is not possible to determine a conclusive focus position. With the present invention however, it is possible to detect only a peak while correcting contrast value, and it is not necessary to detect maximum and minimum values.

Also with this embodiment, an nth power of a ratio for brightness evaluation values (reference AE evaluation value/AE evaluation value) is calculated as a correction coefficient. A correction coefficient is calculated using an AE evaluation value that is a minimum close to a focus point, and contrast value is corrected using this coefficient, which means that it is possible to obtain a contrast curve that peaks close to the focus position.

Figure 3:
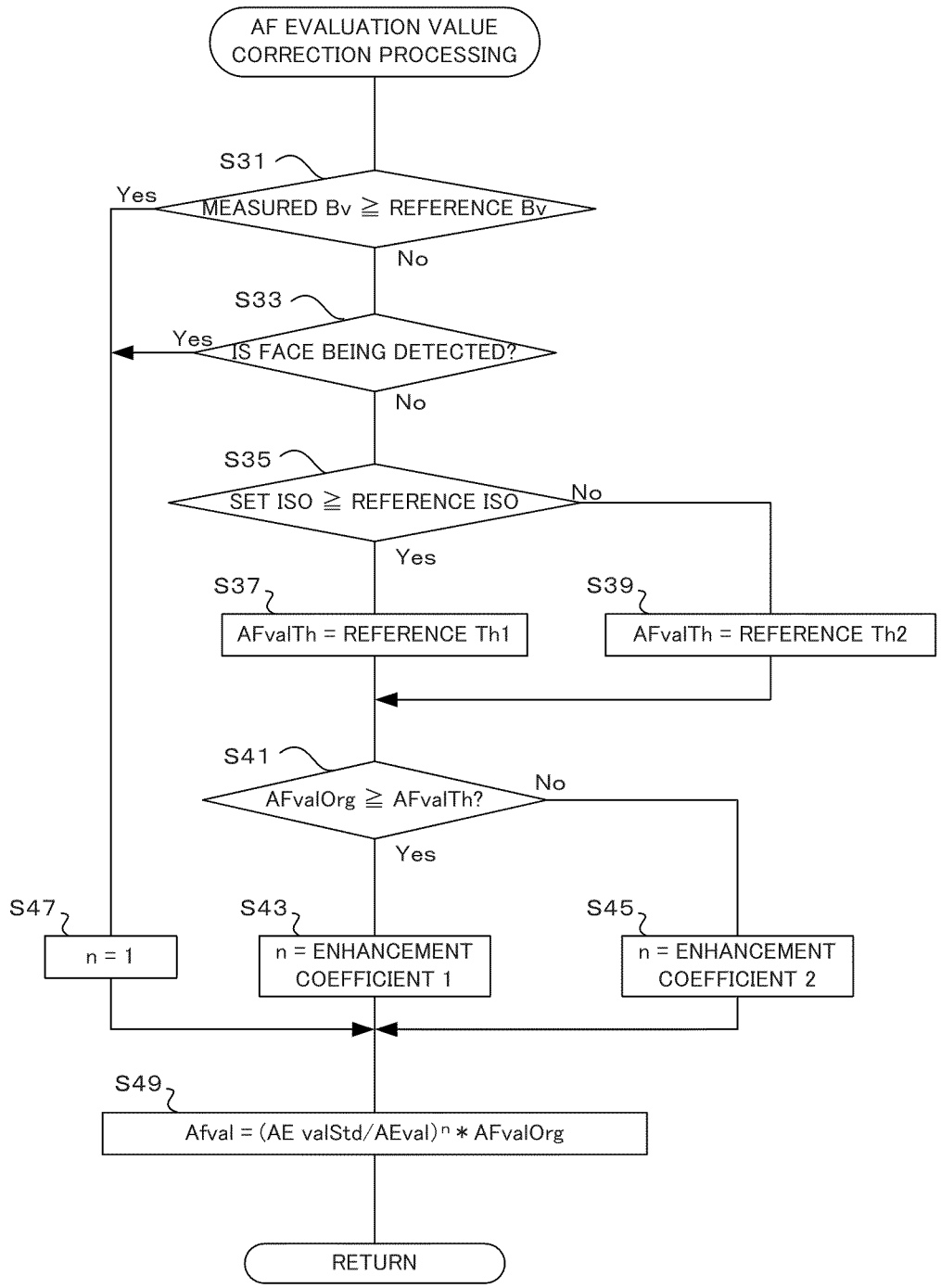
FIG. 3 is a flowchart showing operation of AF evaluation value correction processing for the camera of the one embodiment of the invention.

Further, in this embodiment, in calculating the correction coefficient the correction coefficient is adjusted depending on contrast value, that is, the correction coefficient is varied depending on whether or not an AF evaluation value before correction is larger than an AF evaluation value threshold level (refer to S41 of FIG. 3). This means that it is possible to prevent the occurrence of false focus due to variation in AE evaluation value.

Further, in this embodiment AF evaluation value threshold level is changed in accordance with ISO sensitivity of an imaging section (refer to S35 in FIG. 3). If ISO sensitivity is high, then AF evaluation value also becomes high, which means that with the same AF evaluation value threshold level it is likely that false focus will occur, but by changing the threshold level depending on the ISO sensitivity it is possible to prevent the occurrence of false focus.

Also in this embodiment, it is determined whether or not the correction coefficient is adjusted depending on subject brightness of a subject image (refer to S31 of FIG. 3). This determination is carried out because if the subject is a point light source, the surrounding area will often be dark, such as in a night scene. It is possible to prevent performing of correction processing despite there being no point light source.

Also in this embodiment, it is determined whether or not the correction coefficient needs to be adjusted depending on whether or not a portion of a face is included in the subject image. (refer to S33 of FIG. 3). This determination is carried out because if a face has been detected, the face is generally made a main subject. In this way it is possible to prevent performing of correction processing despite the main subject not being a point light source.

With this embodiment a correction coefficient for AF evaluation value is obtained using a calculation equation (AEvalStd/AEval)$^n$, but this calculation equation is not limiting as long as it is an equation that can change an M-shaped contrast curve to a contrast curve having a peak shape depending on brightness.

Also in this embodiment, an exponential strength coefficient n is changed depending on conditions of subject brightness (refer to S31 in FIG. 3), face detection (S33) and ISO sensitivity (S35), but it is possible to omit any of these conditions and also to add other conditions. As other conditions it is possible to change the strength coefficient depending on scene, such as a night mode etc. It is also possible to apply an exponential function n across the board if a few false focuses are to be permitted.

Also, for this embodiment description has been given using a digital camera as an apparatus for taking pictures, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. In any event, it is possible to adopt the present invention as long as a device is capable of carrying out automatic focus adjustment using contrast AF.

The present invention is not limited to the above described embodiment, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device comprising:
   an imaging section for forming a subject image using a photographing lens, and generating image data;
   a contrast detection section for detecting contrast values corresponding to contrast of the subject image, for every position of the photographing lens, based on the image data;
   a subject brightness detection section for detecting brightness evaluation values corresponding to subject brightness of the subject image for every position of the photographing lens, based on the image data;
   a correction section for correcting the contrast values depending on a brightness evaluation value for a corresponding position of the photographing lens and calculating corrected contrast values; and
   a focus detection section for detecting a focus position of the photographing lens based on the corrected contrast values that have been corrected by the correction section, wherein the correction section calculates a ratio relating to the brightness evaluation values as a correction coefficient, and corrects the contrast values using the correction coefficient, and wherein the correction section adjusts the correction coefficient according to the contrast values.

2. The imaging device of claim 1, wherein:
   the correction section compares the contrast values with a specified threshold level, and determines whether or not to adjust the correction coefficient.

3. The imaging device of claim 2, wherein:
   the correction section changes the threshold value according to sensitivity of the imaging section.

4. The imaging device of claim 1, wherein:
   the correction section determines whether or not to adjust the correction coefficient depending on subject brightness when the image data is acquired.

5. The imaging device of claim 1, further comprising:
   a face detecting section for detection an image portion corresponding to a face in the image data, and wherein the correction section determines whether or not to adjust the correction coefficient depending on whether or not a portion of a face is contained in the image data.

6. An automatic focusing method for an imaging device having an image sensor, comprising:
   forming an image using a lens to generate image data by the image sensor;
   detecting contrast values corresponding to contrast of the subject image, for every position of the lens, based on the image data;
   detecting brightness evaluation values corresponding to brightness of the image for every position of the lens, based on the image data;
   correcting the contrast values depending on a brightness evaluation value for a corresponding position of the lens and calculating corrected contrast values; and
   detecting a focus position of the lens based on the corrected contrast values,
   wherein a ratio relating to the brightness evaluation values is calculated as a correction coefficient, and the contrast values are corrected using the correction coefficient to give the corrected contrast values, and wherein
   the correction coefficient is adjusted according to the contrast values.

7. The automatic focus adjustment method of claim 6, wherein
   the contrast values are compared with a specified threshold level, and it is determined whether or not to adjust the correction coefficient.

8. The automatic focus adjustment method of claim 7, wherein
   threshold value is changed according to sensitivity as the time of generating image data by forming the image.

9. The automatic focus adjustment method of claim 6, wherein
   whether or not to adjust the correction coefficient is determined depending on subject brightness when the image data is acquired.

10. The automatic focus adjustment method of claim 6, wherein
    whether or not to adjust the correction coefficient is determined depending on whether or not a portion corresponding to a face is contained in the image data.

* * * * *